Patented Feb. 3, 1953

2,627,473

UNITED STATES PATENT OFFICE 2,627,473

BACON CANNING

George E. Brissey, Chicago, Ill., assignor to Swift & Company, Chicago, Ill., a corporation of Illinois No Drawing. Application October 9, 1950, Serial No. 189,283

6 Claims. (Cl. 99—187)

The present invention relates generally to the canning of food products, and more particularly to a method for the canning of bacon without heat processing.

Heretofore one of the primary problems in the canning of bacon and other cured meats has been the elimination of gas formation within the sealed cans. The gas-forming bacteria can be inhibited by a rather severe pasteurization treatment, but this is unsatisfactory since in such cases the bacon must be highly cured and specially dried prior to canning and pasteurization, and the resulting product does not have the flavor qualities demanded by consumers.

It is therefore an object of the present invention to provide a method for inhibiting gas formation in canned bacon.

It is an additional object of this invention to provide a method of canning bacon which does not require a heat-processing step in the canning operation.

Additional objects if not specifically set forth herein will be readily apparent to one skilled in the art from the following detailed description of the invention.

In order for canned bacon to be palatably suitable, it must be mild-cured and unprocessed, i. e. not heat pasteurized. Heretofore the heat-processing step has been considered essential to produce canned bacon which would not evolve gases upon storage. It has now been found that by a special treatment, prior to canning, mild-cured bacon can be satisfactorily vacuum-packed in glass jars or the like without pasteurization.

Generally the present invention comprises the reduction in pH of the bacon to within the range pH 4.5–5.2 subsequent to the curing and smoking operations, but prior to vacuum packing in containers.

More particularly, the invention comprises the treatment of mild-cured unprocessed bacon with gluconic acid to effect the desired pH reduction. The gluconic acid may be applied directly to the bacon, or, as in the preferred embodiment of the invention, the sliced, mild-cured bacon may be immersed in a salt and sugar brine solution containing a small percentage of the acid. The brine solution used contains approximately the same salt and sugar content as the bacon being treated so that there will be no loss of these ingredients from the bacon. Due to the ingredients used in the curing of bacon, the acid cannot be added until after the curing and smoking of the bacon.

Instead of adding the gluconic acid directly to the brine, it is many times desirable to add the more easily obtainable glucono-delta-lactone which upon solution forms gluconic acid.

Gluconic acid is the only acid which has been found satisfactory in the present method. Other acids such as acetic, citric, lactic and hydrochloric have been tried as well as monobasic sodium phosphate. In the case of these other acids, it was found that a satisfactory pH lowering was effected to the extent that gas-formation in the canned bacon was inhibited, but at the same time the nature of the acids were such that the acidic condition impaired the flavor of the bacon and was not destroyed during the frying of the bacon for consumption.

The pH reducing agent of the present invention, gluconic acid, does not impair the flavor of the bacon upon frying the same. The reason for this unique result is that the acid upon dehydration, which of course occurs during the frying of the bacon, reverts to glucono-delta-lactone which has a slightly sweetish flavor and no acid characteristics. Hence, by the use of gluconic acid, the present invention permits the reduction of the pH of the bacon to within the acid range required to inhibit gas-formation in the bacon during storage in the container within which is has been packaged, and yet permits the fried bacon to completely relinquish the undesirable and flavor-destroying acid characteristics which result if any other acid is used in effecting the pH reduction.

The sliced, mild-cured bacon, treated by the method of the present invention, is then packaged in suitable containers, e. g. glass jars, under vacuum by any of the conventional vacuum packaging methods known to the art.

Although neither the curing, smoking nor actual vacuum packing operations form part of the present invention, the following example, to which it is to be understood that the claim is not to be limited, illustrates the processing of the bacon through these various operations in conjunction with the gluconic acid treating step of the present invention in order to more clearly illustrate the instant contribution to the bacon-packaging art:

Example

Any known method for producing standard mild cured bacon may be used, as for example, the following method used by the Bureau of Animal Industry, U. S. Department of Agriculture as set forth on page 33 of the January 1950 issue of Food Technology:

"... In curing, fine common salt, commercial brown sugar and potassium nitrate are used. The curing consists of placing the sides of bacon in shallow pans and uniformly covering them with 2.8 per cent of their weight of a curing mixture composed of 1 pound of salt, 0.1 pound of sugar and 0.04 pound of potassium nitrate. The sides are cured for 14 days at 38° F. and then hung on bacon hooks and washed well with a stream of hot water from a hose. After drying, the bacon is smoked with hardwood smoke in a steam heated smoke house. The temperature of the house is held at about 135-140° F. until the internal temperature of the bacon reaches 120° F. This usually occurs in about 4-6 hours. The temperature of the house is then allowed to drop to 110-120° F. and smoking is continued for a total of 24 hours . . ."

The bacon, after having been mild cured and smoked as above or in any other suitable manner, is sliced and then the sliced bacon immersed in a brine solution containing 8 per cent salt and 4 per cent sugar. These percentages may vary, for example, as from 4 to 12 per cent salt and from 2 to 8 per cent sugar, depending upon the particular bacon being treated. 0.3 per cent glucono-delta-lactone is added to the brine and effects the desired reduction in the pH of the bacon, i. e., to within the range 4.5-5.2, in approximately 3 hours. As indicated above, if desired, gluconic acid may be added directly to the bacon to effect pH reduction instead of causing the acid formation in the brine and soaking the bacon therein. Varying concentrations of gluconic acid (glucono-delta-lactone) have been used, e. g. from 0.3 to 10 per cent. The reduction of pH obtained with these varying concentrations of gluconic acid is a function of the length of time of immersion of the sliced bacon therein. For example, sliced bacon with a normal pH of approximately 6.2 has been reduced to a pH of 5.2 by a 5 second dip in a brine containing 1 per cent glucono-delta-lactone and bacon of a comparable original pH has been reduced to a pH of 4.6 by a 60-second dip in a brine containing 10 per cent glucono-delta-lactone.

The sliced bacon, now at a reduced pH, is removed from the brine, drained, "shingled" and placed in 12 oz. glass containers. The containers are then vacuum sealed in any conventional vapor-vacuum capping machine.

Bacon, processed in a manner similar to that described above, has been held in glass jars at an incubation temperature of 99° F. for periods as long as 9 months without the development of gas formation. Bacon treated in accordance with the instant invention and stored as above has good palatability and shows marked improvement over comparable untreated products.

As may be seen from the above example, the present invention permits the production of canned bacon without the use of a flavor-deteriorating, heating step during or after vacuum canning, and at the same time provides for the inhibition of the gas-forming bacteria in the bacon whereby the bacon may be stored for long periods of time even under temperature conditions normally favorable to the development of bacteria without impairing the flavor or keeping qualities of the bacon.

Obviously, many modifications and variations of the invention as hereinbefore set forth may be made without departing from the spirit and scope thereof, and therefore only such limitations should be imposed as are indicated in the appended claims.

I claim:

1. A method of inhibiting gas-formation in vacuum-packed unprocessed canned bacon which comprises treating the bacon with sufficient gluconic acid to reduce the pH of said bacon to within the range pH 4.5-5.2.

2. In the method of canning bacon wherein the bacon is mild-cured, smoked, and thereafter vacuum packed in containers, the step which comprises incorporating sufficient gluconic acid into the bacon subsequent to the curing and smoking operations and prior to the vacuum-packing thereof to inhibit gas-formation in the bacon after vacuum-packing.

3. A method of inhibiting gas-formation in vacuum-packed unprocessed canned bacon which comprises subjecting mild-cured, smoked bacon to the action of a gluconic acid containing brine until the pH of said bacon is reduced to within the range of pH 4.5-5.2, and thereafter vacuum-packing said bacon.

4. As a new article of manufacture, vacuum-packed unprocessed canned bacon containing sufficient gluconic acid to cause the bacon to have a pH within the range pH 4.5-5.2.

5. A method of inhibiting gas formation in vacuum packed, unprocessed canned bacon which comprises treating mild-cured, smoked bacon with a brine solution of approximately the same salt and sugar content as said bacon, said brine solution containing from 0.3 to 10% gluconic acid, until the pH of said bacon is within the range 4.5-5.2, and thereafter vacuum packing said bacon.

6. A method of inhibiting gas formation in vacuum packed, unprocessed canned bacon which comprises treating mild-cured, smoked bacon with a brine solution containing from 4 to 12% salt, 2 to 8% sugar, and 0.3 to 10% gluconic acid, until the pH of said bacon is within the range 4.5-5.2, and thereafter vacuum packing said bacon.

GEORGE E. BRISSEY.

REFERENCES CITED

The following references are of record in the file of this patent:

UNITED STATES PATENTS

| Number | Name | Date |
|---|---|---|
| 1,006,175 | Appelboom | Oct. 17, 1911 |
| 2,059,399 | Rosner | Nov. 3, 1936 |
| 2,362,441 | Jensen et al. | Nov. 14, 1944 |
| 2,478,618 | Armstrong et al. | Aug. 9, 1949 |